Feb. 14, 1939. T. H. MARTEN 2,147,305
DEVICE FOR THE PRESENTATION OF MOTION PICTURES
Filed Dec. 23, 1936   3 Sheets-Sheet 1

Inventor
THOMAS H. MARTEN
By
His Attorney

Feb. 14, 1939. T. H. MARTEN 2,147,305
DEVICE FOR THE PRESENTATION OF MOTION PICTURES
Filed Dec. 23, 1936 3 Sheets-Sheet 2
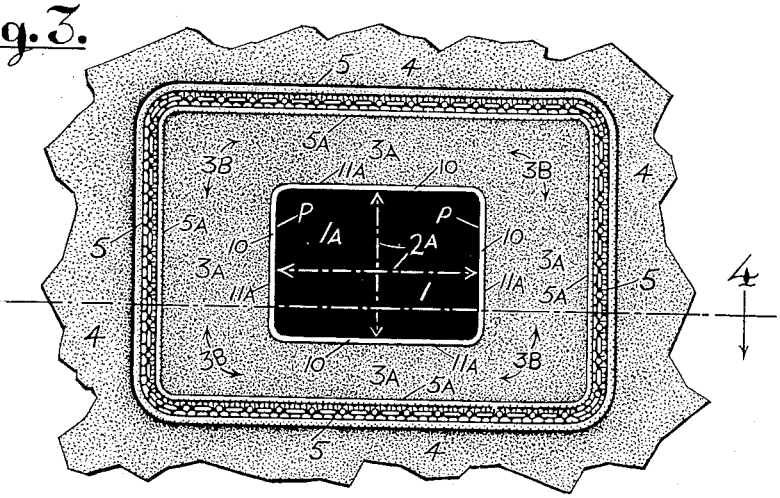
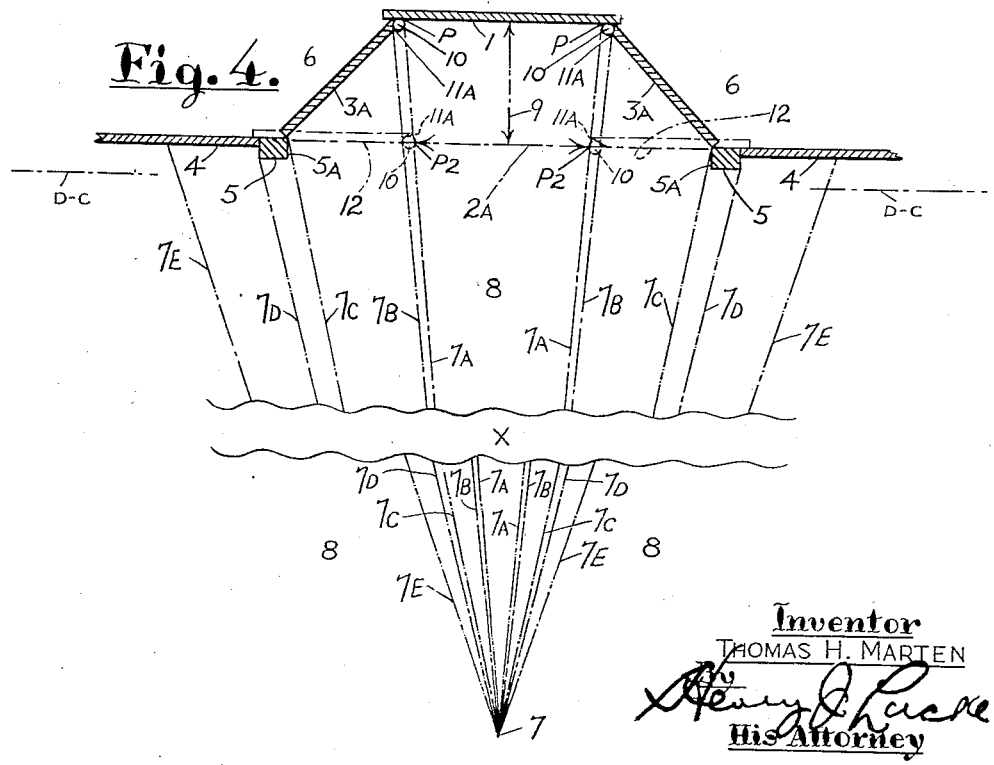
Inventor
THOMAS H. MARTEN
His Attorney Feb. 14, 1939.  T. H. MARTEN  2,147,305
DEVICE FOR THE PRESENTATION OF MOTION PICTURES
Filed Dec. 23, 1936    3 Sheets-Sheet 3
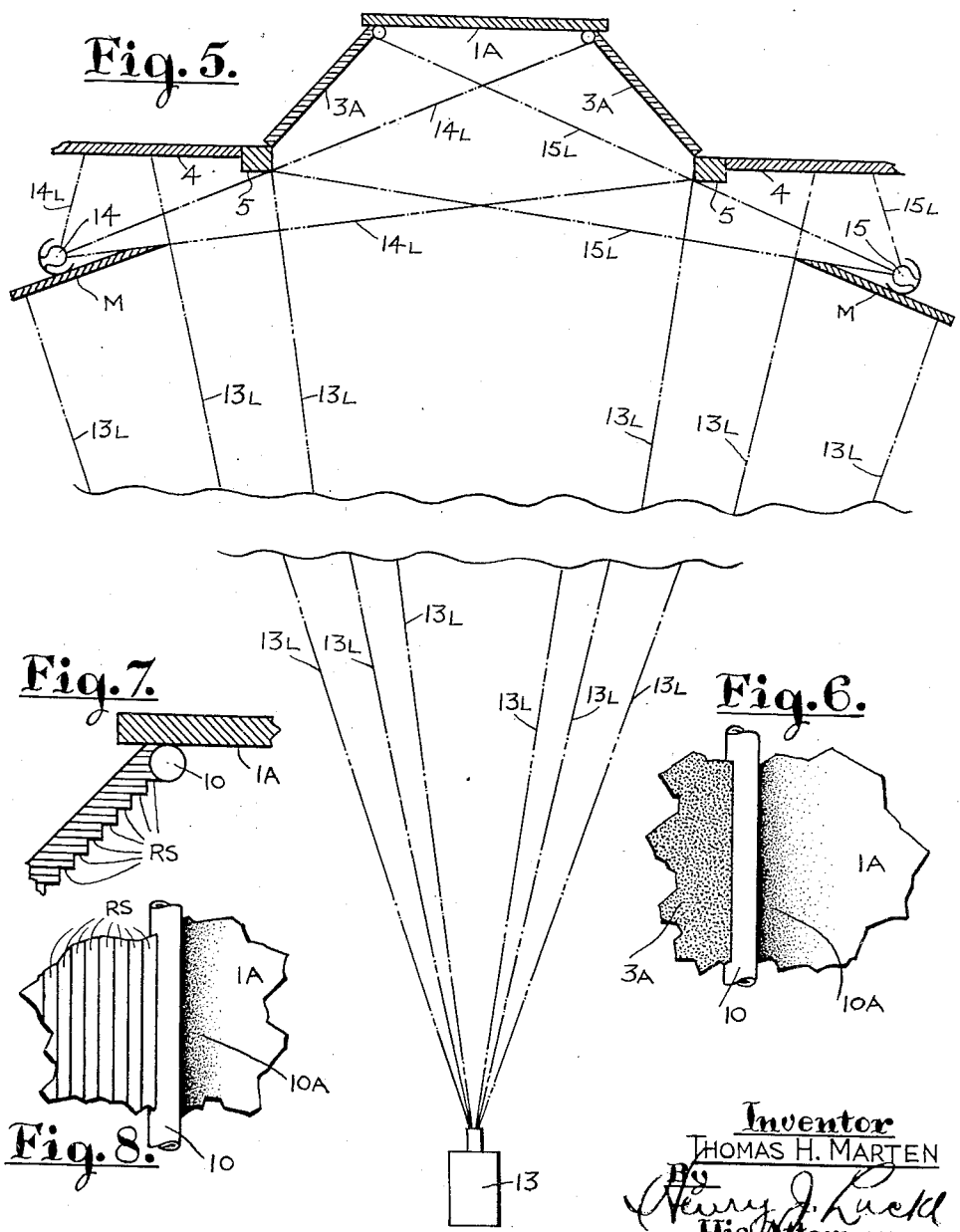

Patented Feb. 14, 1939

2,147,305

UNITED STATES PATENT OFFICE 2,147,305

DEVICE FOR THE PRESENTATION OF MOTION PICTURES

Thomas H. Marten, Toronto, Ontario, Canada

Application December 23, 1936, Serial No. 117,289

13 Claims. (Cl. 88—24)

My invention is a device for the presentation of motion pictures in the theatre.

The principal object of my invention is the production of the visual effect of depth, commonly called the stereoscopic effect, or, the effect of the third dimension of space, so that the picture action will no longer appear to be upon a screen but will appear to be within a space.

Another, but important and related, object of my invention is the improvement of the visual conditions of the auditorium with particular regard to the general vision field of the spectators with relation to the picture thereby increasing the visual efficiency and visual comfort of the spectators resulting in a greatly improved quality in the apparent pictorial contrasts and color and tone values of the picture with apparent detail more clearly and sharply defined.

An important and related result of my invention is an improvement in the acoustical form of the structure surrounding the screen whereby the sound after coming through the screen perforations is expanded into the auditorium.

Achievement of the stated objects is effected coincidentally by the same means.

By "depth" "stereoscopic effect" "third dimension" "space" I mean the visual illusion within the picture of that particular dimension having its direction "toward" and "away from" the spectator. For common understanding I refer to this apparent dimension as "space".

My invention contemplates the use of any standard form of motion picture made and projected in the usual manner. The present high quality of pictorial composition and photography which characterize the better pictures, together with present projection skill and equipment offer all of the visual possibilities necessary for the effective realization of the objects of my invention. I mention this particularly with reference to the principal object, that of the production of the visual illusion of space, because the use of my invention will uphold and extend the pictorial beauty and visual possibilities of the motion picture as a graphic art while imparting to it a fully satisfying measure of the visual effect, or illusion, of space realism.

Throughout the description and claims I avoid unnecessary use of technical terms so that my invention may be clearly understood by persons not possessing special knowledge of the subject.

My invention has resulted from long experience, study and experiment, and should be understood as representing the sum of many visual considerations. My United States Patent No. 1,461,131 dated July 10, 1923, together with my United States Patent No. 1,952,084 dated March 27, 1934, will clearly show the consistency of effort and continuity of development resulting in my present invention as set forth herewith. Thus its practical embodiment although apparently simple will be found upon examination to promote and produce certain physical and mental visual actions and reactions embraced in the following statement of its theory and practice.

All visual phenomena is, in the final analysis, perception, and all perceptive reaction is mental. If the spectators be made space-conscious with relation to the picture then the picture will assume a space-aspect in the minds of the spectators.

The picture in the central field of direct vision is seen with greater visual comfort, presents clearer apparent detail, shows a better quality in apparent pictorial contrasts and color and tone values, and, in addition, presents a greatly improved visual illusion of occupying space, when there is present a balanced supporting illumination in an extended surrounding field of indirect vision and provided the illumination in the two fields connect to form together a single continuous general vision field of physical and mental visual harmony having a logical structural association.

The truth of the foregoing is clearly evident when the real position of the picture is suitably located a greater distance from the spectators relatively to the surrounding field and is particularly the case when the spectator is seated well back in the auditorium so that the angle of observation is such that the immediate, and general, surroundings of the picture are well within the indirect vision field.

My invention in its practical embodiment constitutes a device which sets up a new visual condition between the picture and the spectators in accordance with the foregoing statement of its theory. With its use the picture and the surrounding parts of the illuminated field combine to present a new, visual form arranged to produce in the minds of the spectators the illusion of space within the picture.

In the accompanying drawings:

Figures 3 and 4 are, respectively, a front elevation in detail and a diagram in plan showing the arrangement of the practical embodiment of my invention.

Figure 5 is a diagram in plan showing one method of illumination of the parts of my invention.

Figure 6 is a front view showing an outer part of a picture screen and immediately adjacent parts of my invention on a larger scale for more convenient reference.

Figures 7 and 8 are, respectively, a sectional diagram in plan and a front elevation showing a part of a light-reflecting surface of my invention on a larger scale for convenient reference.

Similar figures and letters of reference indicate corresponding parts in the drawings.

Before describing the practical embodiment of my invention I will describe its theoretical arrangement in a theatre in order that the principle forming the basis of the practical embodiment may be clearly understood.

Figure 1:
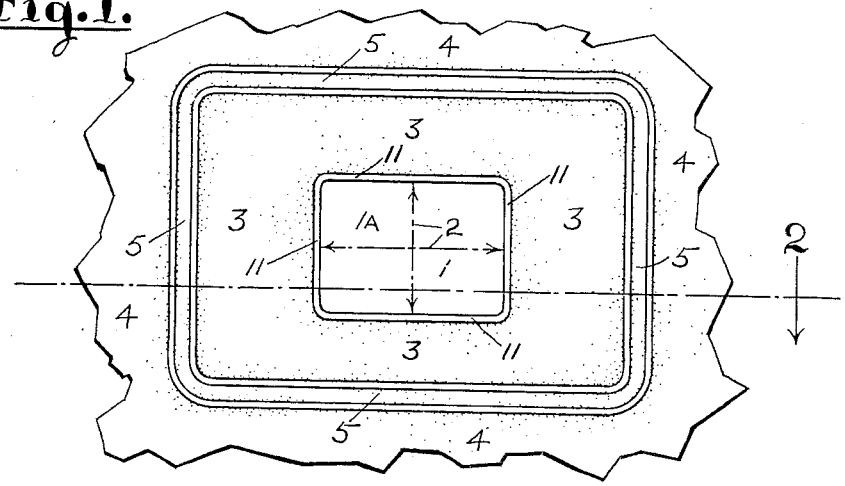
Figures 1 and 2 are, respectively, a front elevation in outline and a diagram in plan showing the theoretical arrangement upon which the principle of my invention is based.
Figure 2:
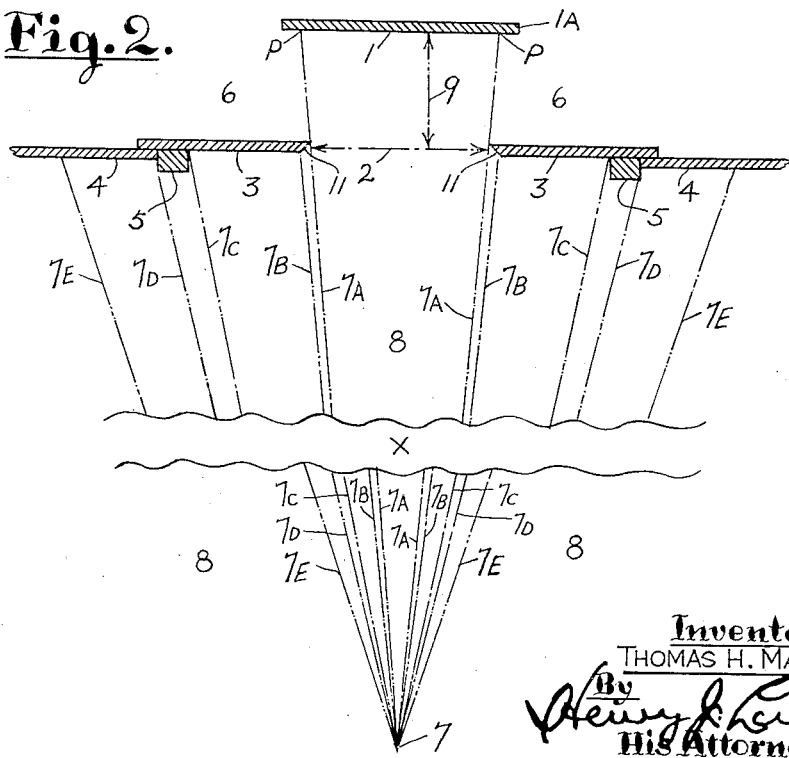

Referring to Figures 1 and 2 of the drawings:—

If a picture 1 in a theatre is viewed through an opening 2, as indicated by the dot-and-dash arrow lines 2, in an illuminated wall or partition 3 erected approximately in the plane of the facing front wall 4 of the auditorium 8 and joining with the proscenium frame 5 and enclosing the space 6 and the picture screen 1A is situated, as shown more particularly in Figure 2, a substantial distance behind the opening 2 with the spectator 7 situated in the auditorium 8, as shown in Figure 2, in front, and centrally, of the opening, and with the edges 11 of the wall, or partition, 3 in visual alinement between the spectator 7 and the boundaries P of the picture 1 as indicated by the dot-and-dash vision lines 7A, 7A, and if no part of the opening 2 embraces, visually, more than the area of the picture 1, the space 9, indicated by the dot-and-dash arrow line 9, extending between the plane of the visible wall, or partition, 3 and the picture-screen 1A, will promote and hold in the mind of the spectator the idea that the space 9 belongs with the objects forming the picture 1 and the objects will appear to move, stand, etc., in space.

The explanation of the illusion is found in the fact that the spectator 7 is made space-conscious with relation to the picture 1, that is to say:— there is set up in the mind of the spectator the idea that there is a space 9 associated with the objects of the picture 1 which is not associated with any other group of objects. The space 9 cannot be interpreted as part of the auditorium 8 because the wall, or partition, 3 encloses and separates it. The edges 11 of the wall, or partition, 3 visually bordering the picture 1, if beveled, as shown more particularly in Figure 2, and painted a bright shade of the color of the face of the wall, or partition, 3, are clearly seen to be in advance of the picture 1 and the spectator 7 will visually place the wall, or partition, 3 in its real position, as shown, between the plane of the picture-screen 1A and the proscenium frame 5 but close to the proscenium frame 5.

The vision lines 7A, 7B, 7C, 7D, 7E, Figure 2, are shown to indicate the direction of sight of the spectator 7 with separate reference to the picture, the edges 11, the wall, or partition, 3, the proscenium frame 5, and the front wall 4 of the auditorium. The vision lines are interrupted by the break X to indicate the spectator 7 is a greater distance from the front of the auditorium than actually shown.

By "wall" or "partition" I mean any character or form of structure which presents, visually, a "surface" to the eyes of the spectator.

Under the conditions described the spectator 7 regards the picture 1 through the space 9 which the mind accepts as part of the structure of the picture 1 and, owing to established habits of rapid association, the mind combines the space 9 with the objects forming the picture 1.

The result is the visual illusion of space within the picture.

My invention is based upon the principle of the foregoing visual illusion. It is obvious, however, that a wall, or partition, presenting surfaces of the theoretical form or arrangement described would have no practical value in a theatre because it could not be effective for more than a very limited number of spectators located approximately centrally of the opening and at an approximately fixed distance. For all other spectators the boundaries P of the picture 1 and the edges 11 of the opening 2 would not be in visual alinement and the visual illusion of space within the picture would be correspondingly poor or would not be produced at all.

For a spectator above or below the level of the center of the picture and proscenium frame the same visual defect is produced. This is evidenced by turning Figure 2 sideways to the right or left thus representing the character of a diagrammatic side elevation.

I mention these visual results in the case of the theoretical wall, or partition, because my invention of the means to reproduce the visual illusion set up by it for the spectator 7 in Figure 2, and equally throughout the auditorium for all spectators occupying reasonable viewing positions, constitutes a practical embodiment of the principle of the theoretical wall, or partition, in a device that fully achieves the objects of my invention as first recited.

In the practical embodiment of my invention I change the position and form of the theoretical wall, or partition, surface 3 by, in effect, moving the edges 11 of the opening 2 back to the plane of the picture screen 1A and joining them to the boundaries P of the picture 1 but leaving the wall, or partition, 3 otherwise connected to the proscenium frame 5 and so arranged in combination with the picture 1 and the proscenium frame 5 and other parts of the facing surface of the front wall 4 of the auditorium that the character of the visual effect and illusion of space created by the theoretical wall, or partition, surfaces is presented to the spectators.

The effect and illusion of space is produced by the change in structure stated in the preceding paragraph particularly set forth as follows.

Referring to Figures 3 and 4 of the drawings:

The inside dimensions of the proscenium frame 5 are of such an extent that the picture 1, situated a substantial distance behind the plane of the proscenium frame 5, is visible from all necessary maximum angles in the auditorium 8.

From the approximate plane of the picture screen 1A and extending from, approximately, the picture boundary P on all four sides to the inner edges 5A of the proscenium frame 5 I provide the angular wall surfaces 3A joined together by rounded corners 3B combining with the surfaces 3A to form a continuous and united surface surrounding the picture and extending divergently from the approximate plane of the picture screen 1A outwardly and forwardly to the approximate plane of the proscenium frame 5.

It will now be clear that if the surfaces 3A and 3B are illuminated and made visible to the spectators in the auditorium 8 and if the continuous surface thus presented is approximately of uniform texture, color, and brightness throughout its extent it will be difficult for the spectators to distinguish the rounded corners 3B from the sides and top and bottom angular surfaces 3A and equally difficult for the spectators to recognize the real form of the combined surfaces 3A and 3B, that is to say:—the spectators will be unable to recognize that the surfaces 3A and 3B converge from the inner edges 5A of the proscenium frame 5 to approximately, the outer boundaries P of the picture 1 and will tend to regard them as being in one vertical plane somewhere between the plane of the picture screen 1A and the plane of the proscenium frame 5 but in general closer to the proscenium frame 5 as hereinafter shown.

Around the boundaries P of the picture 1 I provide the transparent tube 10 disposed along the inner edges 11A of the surfaces 3A and 3B forming the apparent opening 2A, as indicated by the dot-and-dash arrow lines 2A.

The tube 10 is adapted to contain an illuminated gas (advantageously neon gas) and presents to the eyes of the spectators a narrow luminous line forming a frame visually cutting the boundaries P of the picture 1 and regarded by the spectators as the inner edges 11A of the surfaces 3A and 3B forming the apparent opening 2A. In practice it is preferable that this line be of less breadth than shown in the drawings.

The luminous line presented by the tube frame 10 is intended to be of the same color as the surfaces 3A and 3B but of increased brightness. This arrangement produces the apparent effect of a highlight on the edges 11A and of the surfaces 3A and 3B and causes the edges 11A, represented by the tube frame 10, to appear to be in advance of the picture 1 so that the spectators tend further to regard the surfaces 3A and 3B as being in one vertical plane behind, but close to, the proscenium frame 5, as hereinafter stated, and, thus, Figure 3 will present the visual effect of Figure 1 and this will be the case from all reasonable viewing positions in the auditorium 8.

It is obvious, by reference to Figure 4, that when a spectator is not situated centraly of the picture screen the luminous line presented by the tube frame 10 will visually broaden on the sides farther from the spectator and, conversely, the sides nearer the spectator will visually become relatively thinner. This effect is important from the standpoint of a natural perspective regarding the illusion of thickness of the surfaces 3A and 3B.

For spectators above or below the level of the center of the picture and proscenium frame the same character of visual effect is produced. This is evidenced by turning Figure 4 sideways to the right or left thus representing the character of a diagrammatic side elevation.

The surfaces 3A and 3B, in reality coverging rearwardly from the proscenium frame 5 to the picture screen 1A, or, conversely, diverging forwardly from the picture screen 1A to the proscenium frame 5, are accepted by the minds of the spectators as being in a plane approximately close behind the proscenium frame 5, that is to say:— the edges 11A forming the apparent opening 2A represented by the luminous tube frame 10 together with the surfaces 3A and 3B are accepted by the minds of the spectators as having been, visually, brought forward and fitted to each side and top and bottom of the inner edges 5A of the proscenium frame 5 between the edges 5A and the visual boundaries P2 of the picture, as represented by the dot-and-dash lines 12, Figure 4, thus visually reconstructing the character of the original real condition presented by the theoretical wall, or partition, surfaces 3, as shown in Figure 2, but for all spectators in the auditorium equally.

Vision lines drawn from any position in the auditorium to the picture boundaries P will pass through the plane 2A, Figure 4, and the points of intersection in each such case will be the points P2, P2, for that particular spectator and will be the apparent position of the luminous tube frame 10.

Thus is presented the combined visual illusion of a wall surface having an opening which appears to change its position centrally of the wall surface according to the position in the auditorium from which the opening is viewed together with the visual illusion of space within and beyond the opening and in which the picture is seen.

The explanation of the combined visual illusion rests in the fact that the spectators cannot avoid knowledge of the real position of the proscenium frame 5 because of its visible connection with the facing front wall 4 of the auditorium 8, which is a natural visual calculation, and because the tube frame 10 forming the narrow luminous edges 11A tends to visually advance relatively to its real position whereas the tendency of much of the picture composition is to visually recede.

The vision lines 7A, 7B, 7C, 7D, 7E, Figures 2 and 4, are shown to indicate the direction of sight of the spectator 7 with separate reference to the picture, the tube frame 10, the surfaces 3A, the proscenium frame 5 and the front wall 4 of the auditorium. The vision lines are interrupted by the break X to indicate the spectator 7 is a greater distance from the front of the auditorium than actually shown.

The tendency of the luminous tube frame 10 to visually advance is best demonstrated when the proscenium frame 5 and the face of the front wall 4 and the surfaces 3A and 3B are colored a warm, low toned, red.

It will then be in order to show the apparent luminous edges 11A in red highlight. The fine red luminous tube frame 10, defining the edges 11A, will visually stand well forward of its real position and will visually draw the surfaces 3A and 3B with it.

The visual illusion of space within the picture is then produced with greater effect because of apparent greater recession of parts of the picture relatively to the apparent edges 11A, the edges being in reality the tube frame 10.

If the tube frame 10 and its gas content are colored so that the resulting apparent edges 11A are of red light of spectral purity the visual illusion of space within the picture will be at its best because the spectrally pure red light will visually advance the edges 11A the maximum possible and the whole framing structure surrounding the picture 1 will tend to visually flatten out in the plane of the proscenium frame 5 leaving the picture visually behind, thus, the third dimension of space actually a part of the general framing structure is visually subtracted from it and added to the picture.

The explanation of the visual displacement forwardly of the spectral red line, as described, is found in the inherent chromatic aberration in the optical structure of the eyes of the spectators. A change by the muscular function of ocular accommodation is imposed by the spectral purity of the red light as compared with the light of the picture, the same change, in kind, as required for a near object and the minds of the spectators follow their established habit of interpretation of distance.

It is understood of course that the red of the framing structure other than the frame 10 may not be of spectral purity.

Under the conditions described the spectators regard the picture with the same mental attitude as described for the theoretical wall, or partition, surfaces. The real extent of the space 9 separating the plane of the proscenium frame 5 and the plane of the picture screen 1A is unknown to the spectators and will remain unknown provided no designs or patterns, or the like, are used on the surfaces 3A and 3B to provide a basis for visual calculation. The space 9 will present a greater or lesser apparent extent according to the linear and atmospheric perspective in the picture composition.

I do not state that the "magnitude" of the space-consciousness will be the same for all spectators under any or all of the conditions described. It is clearly demonstrated, however, that in all cases and for all spectators the "quality" of the space-consciousness is the same, that is to say:—the visual illusion of space within the picture is produced.

Referring to Figure 5 of the drawings:—

To illuminate the combined surfaces 3A and 3B together with the proscenium frame 5 and the facing surface of the front wall 4 I use, in some cases, the projector 13 in cooperation with the lamps 14 and 15 (which may be any number of lamps spaced around the four sides and masked from view from the auditorium by the masks M) located in suitable positions, each provided with the means to properly spread the light on the surfaces while cutting it off from the picture screen 1A as indicated by the dot-and-dash lines 13L, 14L, 15L. The texture of the surfaces 3A and 3B and of the front wall 4 of the auditorium, together with the proscenium frame 5, is represented in the drawings by the small dots forming the stipple. A definite texture on these surfaces is adapted to receive and reflect the light in a manner best suited to the requirements of my invention.

Referring to Figure 6 of the drawings:—

An enlarged view of a part of the face of the picture screen 1A is shown with a part of a surface 3A in order to more clearly illustrate the relative position of the tube frame 10. The fine black stipple vignette 10A is provided to shield the picture from any direct light from the tube frame 10 and so that the light of the tube frame will stand out a sharp and clearly defined line and, further, so that the picture will gradually fade into deeper visual tone adjacent to the frame 10 thereby adding to the visual depth of the picture relatively to the frame 10.

The tube frame 10 is illuminated, as previously stated, by a gas content made luminous by forming part of an electric circuit. Tubes of this kind are in common use.

Referring to Figures 7 and 8 of the drawings:—

In some theatres a single projector located approximately centrally of the auditorium, as represented by the projector 13, Figure 5, may be used to furnish all the illumination necessary for the combined parts of my invention. In such cases it is desirable to use the arrangement represented by the enlarged view of a part section of a surface 3A, as shown in Figure 7, having the relatively narrow reflecting surfaces RS disposed throughout its extent, as further shown in a front elevation in Figure 8, the reflecting surfaces RS being fixed to the surface 3A in a position relatively parallel to the picture screen 1A, their purpose being to reflect the light projected on them from the central projector 13, Figure 5, into the auditorium 8 without direct reflection upon the picture screen 1A. I find it convenient to use steps, as shown, which may be of any suitable size adapted to be formed by the surfaces 3A and 3B.

It is understood the picture is projected in the usual manner as previously stated.

The projector 13, and the lamps 14 and 15, Figure 5, are represented as providing all the illumination necessary for the surfaces 3A and 3B in combination with the proscenium frame 5 and also for the facing surface of the front wall 4 of the auditorium, but it must be understood that any number of projectors and lamps may be used in order to lessen the intensity of light required to be supplied from any one lamp or projector and it may be found desirable to use separate projectors or lamps for separate control of the light in respect of the surfaces 3A and 3B as distinguished from the proscenium frame 5 or the facing surface of the front wall 4, that is to say:—the lighting of the parts of my invention may be in any manner suitable or convenient for controlling and properly balancing the illumination of the parts relatively.

There should be sufficient illumination of the proscenium frame 5 and the facing surface of the front wall 4 of the auditorium to provide for an approximately correct estimate of their location visually by the spectators. The illumination of these parts should be in color and brightness in harmony with the surfaces 3A and 3B and the tube frame 10.

The relative brightness and color of the light reflected from the combined parts, that is to say:—from the surfaces 3A and 3B and from the frames 5 and 10 together with light reflected from the parts of the front wall 4 constitute an important influence for good upon the auditorium illumination with regard to general visual conditions during presentation of the picture because the greater part of the light necessary to the general illumination of the auditorium will, in this manner, come away from the general position of the picture and consequently the picture will not be diluted to the extent that is the case with ordinary auditorium illumination of the same general volume.

Because of the real positions of the surfaces 3A and 3B relatively to the picture surface, and to the auditorium, light from the picture will be cast on them and reflected to the spectators in proportion to the degree of illumination of the picture. This is important in tending to maintain a brightness balance between the picture and the surfaces 3A and 3B, that is to say:—the brightness of the surfaces 3A and 3B will increase and decrease in step with the picture brightness.

Under these conditions of illumination there is a very marked improvement in the apparent tone, definition, color, and particularly in the contrast values, of the picture so important to upholding the pictorial quality present in the film image.

The essential difference between the common manner of lighting motion picture theatre auditoriums and the manner of my invention as herein set forth is demonstrated when there is no picture on the screen. With the common manner of lighting the screen is at once revealed as such, that is to say:— it immediately shows up as a light surface in a dark field whereas with the manner of lighting by the use of my invention the screen with no picture on it resembles a dark hole in a light field.

All of the combined illumination surrounding the picture achieves the second mentioned object of my invention as an integral part of the production of the visual illusion of space as recited.

One of the fundamental characteristics of the motion picture as compared with the stage play of real people is the, so called, "close up" wherein only the upper part, sometimes only the head, of an actor is shown, that is to say:—it is a basic practice to cut off the lower parts of figures and objects by the lower boundary of the picture. Because of this it is evident that the common form and structure of stage enclosure with the usual three sided proscenium frame, sometimes with a curved top called the proscenium arch, in combination with a floor level, is not in structural harmony with the basic form of motion picture composition. The floor line of the stage of the usual theatre is entirely out of place as related to the motion picture.

My invention fully considers this important structural requirement and it is for this reason, as well as for the promotion of space perception, that my proscenium frame 5 is a fully surrounding frame as stated in the description and claims and must be regarded as basically different from the common form.

Theatre auditoriums for the presentation of motion pictures should be constructed with a full consideration for the basic visual form of the picture resulting from the evolution of the art in the visual sense. Auditoriums otherwise constructed are either obsolete links with the living-stage-form having no relation to the motion-picture-form or are false ornamental or novelty forms straining for some bazaar effect equally unrelated to the picture-form in its essentials as a basic art.

This is particularly true with reference to the production of the visual illusion of a definite three-dimensional space as an integrally mixed part of the picture composition.

It is understood I do not restrict myself as to the structure, color, or brightness I may use in adapting my invention to practice. Many modifications coming within the scope of the appended claims are possible and it is particularly understood that my use of the words "surface" and "surfaces" is intended in a sense to embrace many degrees and kinds of roughness or texture having an average directional plane-extension as defined.

I do not restrict myself to the width, or degree of angularity, of the converging surfaces 3A and 3B nor to the use of the tube structure for the inner frame 10. Any convenient angle may be adopted for any of the surfaces and any form or arrangement of lighting suitable for producing the frame bordering the immediate edges of the picture may be adopted without departing in any way from the intrinsic sense of the appended claims, and it is also particularly understood my use of the word "frame" is intended in its sense to embrace any form of surrounding and, or, enclosing border.

The essence of my invention resides in placing in a plane between the spectators and the picture plane a visible frame surrounding an opening through which another, smaller, frame, closely surrounding the picture, is visible with the picture from all important viewing positions in the auditorium, the space separating the two frames being enclosed on the sides and top and bottom by visible surfaces converging from the nearer, larger, frame to the farther, smaller, frame and means for causing the spectators to tend to regard the converging surfaces and the frames as collectively in approximately one plane spaced forwardly of the picture.

The fine stipple vignette 10A, Figure 6, in addition to making invisible any flare of the light from the tube frame 10 on the picture screen 1A, and in addition to increasing the illusion of depth in the picture relatively to the frame 10, is very important in helping to make less apparent any jump or false movement of the picture as a whole relatively to the stationary frame 10.

The surfaces 3A and 3B diverging from the picture screen toward the spectators form a natural directional outlet into the auditorium for the sound accompaniment of the picture, the angle of the surfaces forming a horn-opening in the nature of a continuation forwardly of the screen of the speaker-horn behind the screen.

Draw-curtains may be fitted in the plane of the dot-and-dash lines D—C, D—C, Figure 4, or as desired.

I claim:

1. In a device for producing in a theatre the visual illusion of space in projected motion pictures, together with improved surrounding illumination, the embodiment with the facing-surface of the front wall of the auditorium of an approximately centrally disposed opening therein surrounded in the vertical plane by the facing-surface of the front wall, a recess extending from the approximate boundaries of the opening between sides and top and bottom surfaces converging in a direction away from the spectators a distance determined by the plane of a picture-screen forming a rear facing-surface of the recess upon which the picture is exhibited, a frame surrounding the opening in approximately the same plane with the facing-surface of the front wall, in combination with means for illuminating the sides and top and bottom converging surfaces and the frame during exhibition of the picture.

2. In a device for producing in a theatre the visual illusion of space in projected motion pictures, together with improved surrounding illumination, the embodiment with a picture-screen upon which the picture is exhibited of an illuminated frame surrounding the picture in approximately the same plane with the picture-screen, a second illuminated frame visually surrounding the first-mentioned frame in a plane spaced forwardly of the first mentioned frame, the height and breadth of the opening in the second mentioned frame being substantially greater than the height and breadth of the first mentioned frame, a third illuminated frame interposed between the first and second mentioned frames comprised of top and bottom and side surfaces disposed angularly to connect the first and second mentioned frames, in combination during exhibition of the picture.

3. In a device for producing in a theatre the visual illusion of space in projected motion pictures, together with improved surrounding illumination, the embodiment with a picture-screen upon which the picture is exhibited, of a transparent tube closely surrounding and bordering the picture in approximately the same plane with the picture-screen, a framing-surface surrounding the picture and divergently extending outwardly and forwardly from the tube away from the picture on each side and top and bottom, in combination with means for separately illuminating the interior of the tube and the framing-surface during exhibition of the picture.

4. In a device for producing in a theatre the visual illusion of space in projected motion pictures, together with improved surrounding illumination, the embodiment with a picture-surface upon which the picture is exhibited of a transparent tube closely surrounding and bordering the picture in approximately the same plane with the picture-surface, masking-surfaces surrounding the picture-surface and the tube and extending from the tube divergently outwardly and forwardly on each side and top and bottom, rounded corner joints where the sides and top and bottom of the diverging masking-surfaces join together, an outer frame surrounding the masking-surfaces, in combination with means for illuminating the tube, the masking-surfaces, and the outer frame during exhibition of the picture.

5. In a device for producing in a theatre the visual illusion of space in projected motion pictures, together with improved surrounding illumination, the embodiment with the facing-surface of the front wall of the auditorium of an approximately centrally disposed opening therein, a recess extending from the approximate boundaries of the opening between surfaces converging in a direction away from the spectators, a picture-screen forming a rear facing-surface of the recess upon which the picture is exhibited, a frame closely surrounding and bordering the picture and disposed along the rear edges of the converging surfaces, a second frame closely surrounding and bordering the opening and disposed along the forward edges of the converging surfaces, means for illuminating the facing-surface of the front wall and the second mentioned frame and the converging surfaces in combination with separate means for illuminating the first mentioned frame to cause the spectators to tend to regard the first mentioned frame and the converging surfaces as being in an apparent single plane approximately in the real plane of the second mentioned frame and to regard the objects forming the picture as being in a space recessed behind the apparent plane of the first mentioned frame during exhibition of the picture.

6. In a device for producing in a theatre the visual illusion of space in projected motion pictures, together with improved surrounding illumination, the embodiment with the facing-surface of the front wall of the auditorium of an approximately centrally disposed opening therein, a recess extending from the approximate boundaries of the opening between surfaces converging in a direction away from the spectators, a picture-screen forming a rear facing-surface of the recess upon which the picture is exhibited, a rear frame closely surrounding and bordering the picture and disposed along the rear edges of the converging surfaces, a forward frame closely surrounding and bordering the opening and disposed along the forward edges of the converging surfaces, means for illuminating the facing-surface of the front wall of the auditorium and the forward frame and the converging surfaces, in combination with separate means for illuminating the rear frame to cause the spectators to regard the objects forming the picture as being in a three-dimensional space visually bounded in the vertical plane by the rear frame and apparently extending in the horizontal plane in a direction rearwardly of the rear frame.

7. In a device for producing in a theatre the visual illusion of space in projected motion pictures, together with improved surrounding illumination, the embodiment with a picture-screen upon which the picture is exhibited of a visual-cutting-line frame having rounded corners closely bordering, and visually cutting the edges of, the picture, a surface extending divergently outwardly and forwardly from each of the sides and top and bottom of the visual-cutting-line frame to a larger frame, having rounded corners, spaced forwardly of the visual-cutting-line frame, the four divergent surfaces being joined together at their corners by curved surfaces to form one united continuous surface having invisible corners, in combination with means for illuminating the visual-cutting-line frame to cause it to appear to stand in a plane nearer the spectators relatively to its real plane and means for illuminating the four divergent surfaces and the four curved corner surfaces and the second frame during exhibition of the picture.

8. In a device for producing in a theatre the visual illusion of space in projected motion pictures, together with improved surrounding illumination, the embodiment with a picture-screen upon which the picture is exhibited of a narrow frame, having curved corners closely bordering the picture, four surfaces extending divergently outwardly and forwardly from the four outer sides of the narrow frame to the four inner sides of a larger second frame, having curved corners, spaced forwardly of the narrow frame, in combination with four curved corner surfaces joining the four diverging surfaces, the eight surfaces unitedly forming a continuous surface with invisible joints, and means for illuminating the two frames and the eight surfaces during exhibition of the picture.

9. In a device for producing in a theatre the visual illusion of space in projected motion pictures, together with improved surrounding illumination, the embodiment with a picture-screen upon which the picture is exhibited of a narrow frame closely bordering the picture, four surfaces extending divergently outwardly and forwardly from the four outer sides of the narrow frame to the four inner sides of a larger second frame spaced forwardly of the narrow frame, in combination with means for illuminating the narrow frame to cause it to appear to be the rear edges of the divergent surfaces, the narrow frame and the divergent surfaces being of a red color, means for illuminating the divergent surfaces with red light in combination with separate means for illuminating the narrow frame with red light of increased brightness relatively to the divergent surfaces during exhibition of the picture.

10. In a device for producing in a theatre the visual illusion of space in projected motion pictures, together with improved surrounding illumination, the embodiment with the facing-surface of the front wall of the auditorium of an approximately centrally disposed opening therein, a recess extending from the approximate boundaries of the opening between sides and top and bottom surfaces converging in a direction away from the spectators a distance determined by the plane of a picture-screen forming a rear facing-surface of the recess, upon which the picture is exhibited, a multiplicity of light-reflecting-surfaces distributed over the extent of the sides and top and bottom converging surfaces, each light-reflecting-surface being in a plane approximately parallel with the plane of the picture-screen in combination with light sources positioned to illuminate the light-reflecting-surfaces so that the light will be reflected therefrom into the auditorium to the spectators with no direct reflection from the light-reflecting-surfaces to the picture-screen, during exhibition of the picture.

11. In a device for producing in a theatre the visual illusion of space in projected motion pictures, together with improved surrounding illumination, the embodiment with a picture-screen upon which the picture is exhibited of a narrow frame closely bordering the picture, surfaces extending divergently outwardly and forwardly from the narrow frame to a larger, second, frame spaced forwardly of the narrow frame, means for illuminating the larger, second, frame and the divergent surfaces in combination with separate means for illuminating the narrow frame with light brought to a focus behind the retina by the lens system of the eye of the spectator while the eye is focused on the picture.

12. In a device for producing in a theatre the visual illusion of space in projected motion pictures, together with improved surrounding illumination, the embodiment with the facing-surface of the front wall of the auditorium of an approximately centrally disposed opening therein fully surrounded in the vertical plane by the facing-surface of the front wall, a recess extending from the approximate boundaries of the opening between sides and top and bottom surfaces converging in a direction away from the spectators a distance determined by the plane of a picture-screen forming a rear facing-surface of the recess, upon which the picture is exhibited, a front frame closely surrounding and bordering the opening in approximately the same plane with the facing-surface of the front wall, a rear frame closely surrounding and bordering the picture in approximately the same plane with the picture-screen, means for illuminating the front frame and the sides and top and bottom converging surfaces in combination with separate special means for illuminating the rear frame with light of different refrangibility from the light of the picture to create a condition of differing focal adjustment of the eye of the spectator when the eye is directed alternately to the rear frame and the picture-screen during exhibition of the picture.

13. In a device for producing in a theatre the visual illusion of space in projected motion pictures, together with improved surrounding illumination, the embodiment with the facing-surface of the front wall of the auditorium of an approximately centrally disposed opening therein fully surrounded in the vertical plane by the facing-surface of the front wall, a recess extending from the approximate boundaries of the opening between sides and top and bottom surfaces converging in a direction away from the spectators a distance determined by the plane of a picture-screen forming a rear facing-surface of the recess, upon which the picture is exhibited, a front frame closely surrounding and bordering the opening in approximately the same plane with the facing-surface of the front wall, in combination with means for illuminating the facing-surface of the front wall and the front frame and the sides and top and bottom converging surfaces the said means comprising light sources positioned at intervals in a vertical plane spaced forwardly of the facing-surface of the front wall and fully surrounding the front frame a distance therefrom determined by the position of a light-masking wall, the light sources being hidden from view from the auditorium by the light-masking wall, and means for shielding the picture-screen from light from the light sources.

THOMAS H. MARTEN.